United States Patent [19]
Thompson

[11] 3,861,048
[45] Jan. 21, 1975

[54] COMPENSATED DIOPTER GAUGE

[75] Inventor: Kenneth B. Thompson, Hialeah, Fla.

[73] Assignee: Optical Standards Company, Incorporated, Lancaster, Calif.

[22] Filed: Sept. 25, 1972

[21] Appl. No.: 291,687

[52] U.S. Cl. ......... 33/174 A, 33/172 R, 116/124 R, 356/124
[51] Int. Cl. ...... A61b 5/08, A61b 5/10, B23f 23/08, B23g 17/04
[58] Field of Search.. 33/174 A, 174 R, 200, 172 R, 33/178 R, 172 B, 173, 169 R, 169 B, 169 C, 147 R, 147 D, 147 F, 147 G, 147 H–147 K, 143 R; 356/124; 116/129 R

[56] References Cited
UNITED STATES PATENTS

| | | | |
|---|---|---|---|
| 595,865 | 12/1897 | Reisner | 33/172 R |
| 1,563,468 | 12/1925 | Carreau | 33/172 R |
| 1,595,417 | 8/1926 | Rayton | 33/172 R |
| 2,600,498 | 6/1952 | Hammerly | 33/172 R |
| 2,916,828 | 12/1959 | Wait | 33/172 R |
| 3,479,744 | 11/1969 | Howland | 33/172 R |

*Primary Examiner*—Henry K. Artis
*Attorney, Agent, or Firm*—Fulwider, Patton, Rieber, Lee & Utecht

[57] ABSTRACT

A diopter gauge having a large scale and associated indicator needle whereon one diopter is indicated by each complete revolution of the needle, a first small scale and indicator needle which registers ten revolutions of the large indicator needle and a second small scale and indicator needle which registers two revolutions of the first small indicator needle. A compensating scale is associated with the large scale and indicator needle whereby said indicator needle may be set to compensate for the linearity error of the sagitta versus diopters, so that the sagitta scale is actually reading diopters.

5 Claims, 4 Drawing Figures

PATENTED JAN 21 1975 3,861,048

COMPENSATED DIOPTER GAUGE

STATE OF THE PRIOR ART

For many years the ophthalmic lens industry has used a device called a Geneva Gauge for measuring spherical surface curvatures in diopter units. In the precision optical industry, spherometers of higher accuracy are used for gauging radius of curvature, but these instruments have the drawback that charts have to be used in converting sagitta into radius of curvature, or diopters.

The Geneva gauge operates on the same geometric principle as most spherometers. Presently used Geneva Gauges have a pair of hardened, fixed contact points, usually steel balls, that are spaced apart twenty to thirty millimeters on the underside of the instrument. In use, these points contact the surface to be measured. Midway between the two fixed points is a plunger that moves up and down against spring tension on a line perpendicular to a line between the pair of fixed points. The up and down motion of the plunger rotates a pinion gear through a rack, integral with the plunger. On the same shaft with the pinion gear is an indicator needle capable of only two revolutions relative to the dial face, one revolution for convex curves and one for concave curves. The dial face is calibrated to read directly in diopters in increments of one-eighth diopter. The range of measurement is 17 diopters for both concave and convex curves.

The Geneva Gauge generally has only two fixed points which makes it possible to measure cylindrical curves as well as spheres. When the curves are always spherical, the measuring device generally has three fixed points or "legs," disposed 120° apart from the axis of the plunger. Alternatively, the spherometer is designed to have ring contact with a spherical surface to be gauged.

The precision attainable in the present Geneva Gauge is quite poor because there is only one dial revolution of the needle for the total range of 17 diopters. Greater precision could be designed into the instrument through the use of a gear train between the pinion gear and the rotary indicating needle causing the reading range to be spread over two or three revolutions. However, for more than two or three revolutions the scale would become very cumbersome and impractical because of the non-linearity of diopters versus sagitta. Conceivably, a spiraling calibration on the dial face to cope with the non-linearity over two or three rotations of the needle could be provided, but for more than this, the scale would be cumbersome and impractical.

BACKGROUND OF THE PRESENT INVENTION

In the compensated diopter gauge of the present invention, the reading range may be spread over as many as 17 revolutions of the needle without overlapping scales in the manner described above.

The dial indicator utilized in the present invention is commercially available and may be of a type produced by L. S. Starrett Co., Cat. No. 656-611. Each of the smallest graduations on a large scale dial read 0.0001 inch. Each 0.010 inch movement of a plunger which actuates the large scale needle, moves the needle through one revolution of the large scale dial. A first smaller dial and needle indicates each revolution of the large needle and has ten graduations per revolution, therefore, one revolution of its needle indicates a plunger travel of 0.100 inches.

A second small dial has three graduations marking zero, one and two, indicating revolutions of the first small dial, the total movement of the plunger is a little over 0.200 inches. In use, a contact ring surrounds the plunger and when a spherical surface is seated against the peripheral edge of the contact ring, the plunger is moved a number of decimal inch units equivalent to the sagitta value of the spherical surface, such as that presented by an ophtalmic lens, and recorded on the three scales. One contact ring is used for measuring convex curves which is interchangeable with a second contact ring, used for measuring concave curves.

The present invention provides a compensating scale, associated with the large scale on the dial which is mathematically computed to compensate for the linearity error of the sagitta versus the diopters, so that the sagitta scale is actually reading diopters. In other words, the direct reading from one or more of the three dials provides an accurate diopter measurement of the curvature of a lens.

DETAILED DESCRIPTION OF THE DRAWINGS

Figure 1:
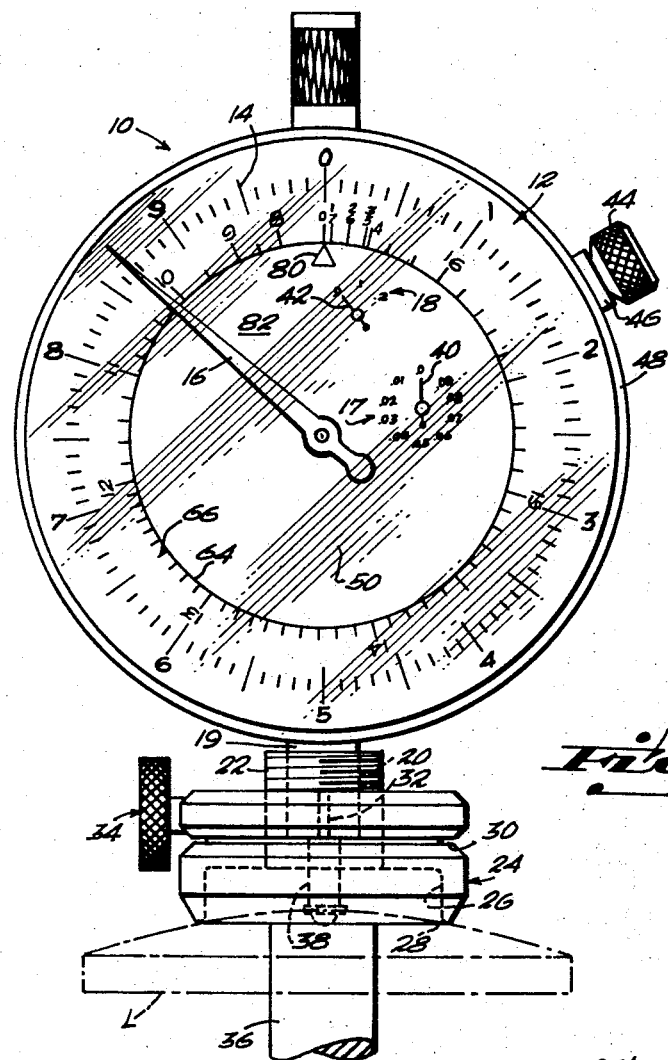
FIG. 1 is an elevational view of a compensated diopter gauge, in accordance with the present invention, equipped with a contact ring for measuring convex curves.

With reference to the drawings in which like reference numerals designate like or corresponding parts throughout the several views and with particular reference to FIG. 1, the numeral 10 generally indicates a commercially available dial gauge indicator incorporating the present invention.

The dial gauge 10 includes a first, large dial gauge 14 and indicator needle 16. The large gauge 14 is divided into ten numbered major divisions and each major division is divided into ten minor divisions for a total of one hundred minor divisions. First and second small gauges 17 and 18 record the number of rotations of the needle 16 as will be subsequently described in detail.

A sleeve 19, extending downwardly from dial gauge 10, is fixed by a set screw 20 to an externally screw threaded sleeve 22 which is, in turn, threaded into an annular base member 24 providing an upwardly extending annular cavity 26, defining a bottom contact ring 28. Conventional clamp means in the form of slits 30 and 32 and thumb screw 34 rigidly, adjustably fix the annular member 24 to the screw threaded sleeve 22. A pedestal base (not shown) including a standard, fragmentarily illustrated at 36, supports the device on a flat table top surface, for example.

A movable plunger 38 extends axially downwardly through the annular member 24 in a concentric relation to the contact ring 28 and conventionally drives a gear train connecting with the large indicator needle 16 to record the movement of the plunger 38 on the dial gauge 10. Drive means connect between the indicator needle 16 and the needles 40 and 42 of the first and second small gauges 17 and 18.

In operation, the annular member 24 is vertically rotatably adustable, relative to the plunger 38, on the screw threaded sleeve, whereby an optical flat can be placed against contact ring 28 and the plunger 38 will be moved upwardly a distance sufficient to move the indicator needle 16 to register with the zero marking on the gauge 14.

Most commercial dial indicators of the type illustrated in FIG. 1 have a large dial scale such as 14 that can be rotated by loosening a small thumbscrew 44 which controls a clamp finger 46, normally engaged on the outer peripheral rim 48 of the dial coverglass 50. When the thumbscrew is loosened, the dial face 14, rim 48 and coverglass 50 can be rotated as a unit. In this manner, the dial 14 can be quickly adjusted, for linear distance measurements, to set the gauge 14 to zero relative to the needle 16 when an optical flat is placed against the contact ring 28.

The large dial scale 14 in FIG. 1 is composed of 10 major, numbered divisions each of which represents a decimal linear measurement of 0.001 inch; each of the 10 minor divisions of each major division represent the smallest linear measurements of 0.0001 inch. Consequently, one complete revolution of the large indicator needle 16 indicates a linear measurement of 0.01 inch.

The first small gauge 17 is mechanically connected to the large indicator needle 16 and provides ten divisions ranging from 0.01 inch back to zero representing 10 revolutions of the large indicator needle 16 or a measurement of 0.1 linear inch.

The second small gauge 18 is mechanically connected to the first small gauge needle 40 and provides three divisions ranging from zero to 2 representing two revolutions of the needle 40 and a linear measurement of 0.2 inch.

Figure 2:
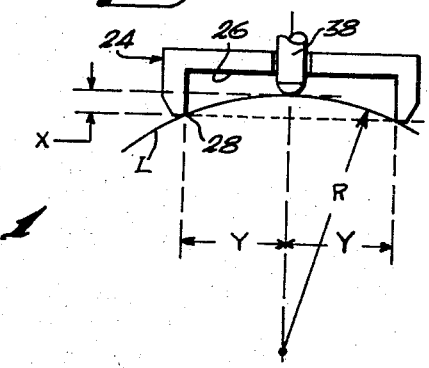
FIG. 2 is a diagrammatic view of the base member and contact ring of FIG. 1, illustrating the geometry thereof.

In use, the convex face of a lens L is seated against the contact ring 28 as illustrated in FIGS. 1 and 2, resulting in a portion of the convex face extending into the cavity 26 a distance determined by the amount of curvature thereof. In FIG. 2, the broken curve represents the convex face of the lens L and it is apparent that the plunger 38 has been depressed a distance indicated by X which represents the sagitta of the lens.

As previously described, the gauge is first conditioned by placing an optical flat against the contact ring and the large dial is adjusted to read zero relative to the large needle 16.

Therefore, the lens curve L in FIG. 2 will depress the plunger 38 a distance which will record on one or more of the dials the exact decimal measurement of the sagitta X. For example, if the sagitta is less than 0.01 inch, the reading is made directly on the large scale 14. If the sagitta is 0.045, for example, the first small needle 40 is positioned midway between 0.04 and 0.05 and the large needle 16 is positioned on the 5. When the sagitta dimension is over 0.1, the second and first small dials 18 and 17, and the large dial 14 provide the measurement in the above order.

Figure 3:
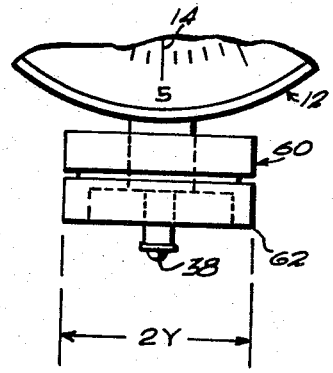
FIG. 3 is a fragmentary, semi-schematic view of a contact ring, for measuring concave curves, which is optionally interchangeable with the contact ring for measuring convex curves.

FIG. 3 illustrates an annular base member 60 for measuring concave curves which is optionally interchangeable with the base member of FIG. 1. The contact ring 62 for concave measurements is on the outer rim of the base 60, whereas, on the convex measuring base 24 of the contact ring 28 is on the inner rim. In order for the scale calibrations to agree for both concave and convex curves, it is quite apparent that the inside diameter 2Y of the annular cavity in FIG. 2 must be the same as the outside diameter 2Y of the FIG. 3.

Referring to FIG. 1, and as previously described, the large dial scale 14 is attached to the coverglass cell forming an annulus having an inner margin 64. The large scale 14 is provided with a compensating scale 66 adjacent to the margin 64. This compensating scale 66 is associated with the standard commercial dial scale 14 and is mathematically calculated to correct the error created by the non-linearity of diopters versus sagitta, resulting in a direct reading of diopter values. For example, with a given curve, if the second small needle 42 indicates 0.1 plus, on the second small dial scale 18, the first small needle 40 indicates 0.02 plus, on the first small dial scale 17, and the large needle 16 indicates 5 on the large dial scale, the reading of 0.125 inches gives a direct reading of 12½ diopters with the use of the compensating dial 64 of the present invention. The number 0.1 on the scale 18 indicates 10 diopters plus two diopters, indicated by the scale 17, plus 0.5 or one-half diopter on the large scale 14 for a total of 12½ diopters.

For a diopter value reading under 10 diopters, the number indicated on the first small dial 17, 0.04 for example, indicates four diopters, plus the reading 3 on sale 14, indicating 0.3 of a diopter, for a total reading of 4.3 diopters. In other words a direct diopter reading for any value is achieved by moving the decimal point two places to the right.

With reference to FIG. 2, which shows the geometry of the ring-type base member 24 and the diopter gauge of the present invention, X is the sagitta, Y is the radius of the contact ring and R is the radius of curvature of the surface being measured, indicated L. The mathematical relationships between these quantities are as follows:

$$R^2 = Y^2 + (R-X)^2 \quad (1)$$

We now examine the relationship between $X$ and $Y$ and diopters, where $N$ is the index of refraction of the lens material. By definition, diopters as a measure of surface power is:

$$D = N-1/R \quad (2)$$

When $N = 1.53$ and $R$ is in meter units, $D$ is diopters

If a standard commercial dial indicator, utilizing the kind of compensation required by the present invention, is used to read directly in diopters, it is necessary to find the value of Y in terms of the dial gauge units that will fit the desirable diopter graduations. For example, with the dial gauge in decimal units, illustrated in FIG. 1, and it is desired to have a 0.01 sagitta or X value to read 1.00 diopter. To find the radius of the contact ring Y we must first transpose Equation (2) to inch units from meters. To do this we multiply the numerator and denominator thereof by 39.37 so that:

$$D = 20.8661/R \quad \text{inches} \tag{3}$$

Substituting: $D = 1$ $$R = 20.8661/D \text{ or } 20.8661 \tag{4}$$

Going back to Equation 1, we solve for Y, $$Y = (2RX - X^2)^{1/2} \tag{5}$$

Substituting:
$2R = 41.7322$
$X = 0.01$
$Y = 0.64593$ inches

This figure for Y is compatible with the diameters of the ophthalmic lenses to be measured and the precision inherent in the diameter of the contact ring is approximately 2.5 times that of the Geneva Gauge with contact points separated by 20 millimeters.

Having calculated the value of Y that will make one diopter read 0.01 inches, the non-linearity error for higher diopter values is as follows:

Table 1.

| D | X Inches | Error |
|---|---|---|
| 1.00 | 0.01000 | 0.00000 |
| 2.00 | 0.02002 | 0.00002 |
| 6.00 | 0.06051 | 0.00051 |
| 10.00 | 0.10249 | 0.00249 |
| 16.00 | 0.17120 | 0.01120 |

From the above results, it is apparent that there is a rapid increase in error between 10 and 16 diopters. In fact, with the dial indicator of FIG. 1, there is a slightly more than one revolution of the large needle 16 represented by this error of 0.01120 at 16 diopters. It has been established by experiment that the error at 16 diopters can be reduced by reducing the radius of the contact ring Y somewhat, so that an increment of one diopter will be closer to matching 0.010 inches at 4 or 5 diopters. After several trial substitutions, $Y = 0.642$ gives a generally optimized solution. For this Y value, the table below shows the non-linearity errors.

Table 2.

| D | X | Error |
|---|---|---|
| 0.00 | .00000 | .00000 |
| 2.00 | .01977 | −.00023 |
| 4.00 | .03965 | −.00035 |
| 6.00 | .05977 | −.00023 |
| 8.00 | .08025 | +.00025 |
| 10.00 | .10122 | +.00122 |
| 12.00 | .12284 | +.00284 |
| 14.00 | .14536 | +.00536 |
| 16.00 | .16897 | +.00897 |
| 18.00 | .19401 | +.001401 |
| 20.00 | .22091 | +.02091 |

In comparing the error value with the previous tables, it can be seen that the error at 10 diopters is approximately one-half that for the Y value of 0.64593 and the rotation of the indicator needle 16 for this error is well within one revolution.

Having generally optimized the value of Y, the final step in making the high-precision, direct reading diopter gauge of the present invention is the compensation for the non-linearity errors indicated above.

The present invention eliminates the errors through the use of the second set of graduations represented by the compensating dial 66 in FIG. 1. As previously described, the large dial 14 is adjustable to be set at zero relative to the needle 16 when an optical flat is positioned against the contact ring 28 prior to making a measurement.

By observing the error-values of table 2, the largest minus figure is at four diopters. Thus, if we establish an index mark 80, straight up at the top of the fixed portion 82 of the dial face, the large scale 14 will have to be rotated counterclockwise 0.00035 (3.5 divisions on the large scale 14) in order to indicate "4" on the compensating scale 66 relative to the index mark 80. When a four diopter convex curved surface is placed in contact with the ring 28, the first small needle 40 will register with 0.04 on the first small dial 17 and the large needle 16 will register with 4 on the compensating dial 66. This occurs because the large scale 14, being integral with the compensating scale 66, has been preadjusted to compensate for the 0.00035 error, indicated on the compensating dial 64.

Applying this same procedure for locating all of the divisions of the compensating scale 66 up to 16 diopters, relative to the index mark 80, the error value can be subtracted from the large scale 14 for any radius of curvature and readout directly in diopters. The operator has only to set the compensating scale 66 to the same diopter value as he reads on the linear scale.

It is possible to carry the compensating scale beyond 16 diopters, but this would involve overlapping the scale upon itself. The need for diopter measurements beyond 16 is too uncommon to warrant this complexity. A chart can be supplied for reading higher than 16 diopters.

From the relationship of the compensating scale to the linear scale, it can be seen that by making the linear scale and compensating scale read the same value (for diopters) an unknown curve can be measured on the linear scale with great precision. In effect, the use of the two scales automatically subtracts the linearity error of the sagitta versus diopters, so that the sagitta scale is actually reading diopters.

In the foregoing description, the concept of the present invention has been based upon a sharp edge contact ring as illustrated in FIGS. 2 and 3. In practice, it is usually difficult to maintain the sharp edge, thus frequent relapping of the base member becomes necessary to maintain precision.

Figure 4:
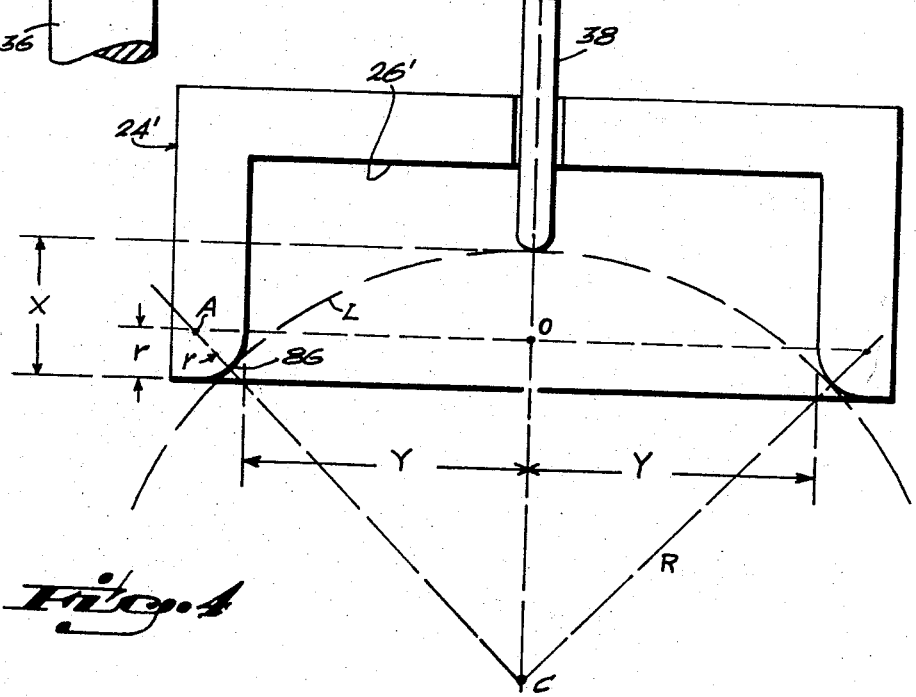
FIG. 4 illustrates the geometry of a modified form of the contact ring, for measuring convex curves, as applied to a diopter gauge in accordance with the present invention.

Without departing from the basic concept of the present invention, a small radius is added to the contact ring that will substantially reduce the wear. FIG. 4 illustrates the radius at 86 and shows the geometry of this modified form of contact ring. In a preferred form of the modification of FIG. 4, the radius 86 is quite small, 0.003 for instance, to keep the compensating scale 66 to one revolution of the rotatable dial.

The compensated diopter gauge of the present invention is equally applicable to gauges providing a linear scale indicating other than decimal inch units, such as millimeters, for example, and the two small gauges 17 and 18 can be omitted and the operator count the revolutions of the needle 16.

FIG. 4 shows the geometry of the curved edge contact ring 86. The center of curvature of the convex curve being measured is at C. The radius of curvature is indicated by R. The inside diameter of the contact ring is 2Y. The small radius on the contact ring to reduce and distribute excess wear is r. The sagitta is indicated by X. The derivation of the mathematical relationships is similar to that of the sharp-edge contact ring. This involves solving triangle AOC, in which the following relationships prevail:

$$(R + r)^2 = [R - (X - r)]^2 + (Y + r)^2$$

Solving this equation for R, we get:

$$R = (Y + r)^2 + (X^2 - 2rX) \qquad (10)$$

or, $$R = (Y + r)^2/2X + (X/2) - r \qquad (11)$$

Solving for X we get:

$$X = (R + r) - [(R + r)^2 - (Y + r)^2]^{1/2} \qquad (12)$$

Substituting, from (2), $R = N-1/D = 0.53/D$, $$X = (0.53/D + r) - [(0.53/D + r)^2 - (Y + r)^2]^{1/2}, \qquad (13)$$

where X is a true sagitta value for a surface power of D diopters.

It will be apparent to one of ordinary skill in the optics art that equation (13) can be expressed in the following more generalized form:

$$X = (0.53/D \pm r) - [(0.53/D \pm r)^2 - (Y \pm r)^2]^{1/2}, \qquad (14)$$

where the minus signs before r apply to the measurement of concave lens surfaces.

Thus, the error in assuming that sagitta value and diopters are linearly related is given by:

$$E = X - DX_1 = (0.53/D \pm r) - [(0.53/D \pm r)^2 - (Y \pm r)^2]^{1/2} - DX_1, \qquad (15)$$

where $X_1$ is the sagitta value selected as nominally equivalent to one diopter.

If r is taken to be 0.003 inches and we recompute the error-values given in Table 2, we find that error values increase quite rapidly and in order to keep the compensating scale to one revolution of the rotatable dial the total range of the gauge must be reduced to less than 16 diopters. However, the existance of this much rounding of the edge is very effective.

What is claimed is:

1. A diopter gauge for measuring the surface power of a curved lens and for compensating for nonlinearities in the relationship of lens sagitta to surface power to provide an accurate reading of the measured power in diopters, comprising:
   dial means including a dial body, linear scale means on a rotatable face portion, associated indicator needle means, and a nonrotatable face portion, said scale means having uniformly spaced markings numbered from zero and indicating predetermined units of diopter measurement;
   a base member fixed with respect to said dial body, for contacting the surface of the lens, said base member including a contact ring having an inner cylindrical wall, an outer cylindrical wall and a lens-contacting edge which is circularly convex in radial cross-section through said contact ring;
   a nonlinear compensating scale also located on said rotatable face portion of said dial means and fixed with respect to said linear scale, said nonlinear scale including a zero mark coincident with zero on said linear scale and a plurality of variably spaced scale divisions consecutively numbered to correspond to diopter values indicated on said linear scale, the location of any of said scale divisions measured from said zero mark being given by the expression:
   $$E = (0.53/D \pm r) - [(0.53/D \pm r)^2 - (Y \pm r)^2]^{1/2} - DX_1$$
   where
   $E$ = an error value in an uncompensated diopter reading, the error value being represented by the distance of a particular one of said scale divisions measured from said zero mark in the same units as are used for said linear scale but in a negative direction with respect to said linear scale,
   $D$ = a diopter value corresponding to the particular scale division,
   $r$ = the cross-sectional radius, in meters, of said lens-contacting edge,
   $X_1$ = an incremental sagitta value, in meters, corresponding to an incremental diopter value of unity on said linear scale, and
   $Y$ = the radius, in meters, of said inner cylindrical wall, for convex surface measurements, or said outer cylindrical wall, for concave measurements, the value of Y being selected to yield a zero error value, E, for a particular value of D;
   fixed reference means on said non-rotatable face portion of said dial means; and
   means for moving said linear and nonlinear scales on said rotatable face portion with respect to said fixed reference means to compensate for the nonlinear relationship between the surface power of said lens and the motion of said plunger means;
   whereby a compensated reading of lens surface power in diopters is obtained by first obtaining an uncompensated reading on said linear scale with said reference means pointing to said zero mark, then moving said rotatable face portion until the reading of said reference means on said nonlinear scale is equal to the reading of said indicator needle means on said linear scale, and the error value E is thereby subtracted from the uncompensated reading.

2. The gauge of claim 1, further including means to adjust the initial position of said contact ring with respect to said plunger means, whereby said indicator needle means can be aligned with said reference means when an optical flat is placed against said contact ring.

3. The gauge of claim 1, wherein said lens-contacting edge is a sharp edge and r is practically zero.

4. The gauge of claim 2, wherein said drive means rotates said indicator needle means relative to said linear scale to make substantially one complete revolution for each diopter measured and said needle means indicates fractional diopter values, said dial means further including secondary indicator means to count the number of full revolutions of said indicator needle means and thereby to indicate multiples of one diopter.

5. The gauge of claim 4, wherein said radial distance $Y$ is selected to be less than $[2(0.53) X_1 - X_1^2]^{1/2}$ and the error value $E$ is negative for diopter values below a selected value, positive for diopter values above said selected value, and always less than one diopter in magnitude over the range of the gauge, whereby the error value is always represented by an arc of less than 360° on said nonlinear scale.

* * * * *

UNITED STATES PATENT OFFICE
CERTIFICATE OF CORRECTION

PATENT NO. : 3,861,048
DATED : Jan. 21, 1975
INVENTOR(S) : KENNETH B. THOMPSON

It is certified that error appears in the above-identified patent and that said Letters Patent are hereby corrected as shown below:

Title page, item [75], inventor's address should be --Lake Hughes, California--.

Column 7, line 15, the expression

"$R = (Y+r)^2 + (X^2 - 2rX)$" should be $$--R = \frac{(Y+r)^2 + X^2 - 2rX}{2X} --.$$

Signed and sealed this 24th day of June 1975.

(SEAL)
Attest:

RUTH C. MASON
Attesting Officer

C. MARSHALL DANN
Commissioner of Patents
and Trademarks